United States Patent [19]

Tarumoto et al.

[11] Patent Number: 4,755,116
[45] Date of Patent: Jul. 5, 1988

[54] ROTOR HOUSING FOR A ROTARY PISTON ENGINE HAVING SOFTENED AREAS SURROUNDING THE PLUG HOLES

[75] Inventors: Kouji Tarumoto; Junichi Yamamoto; Yoshifumi Yamamoto, all of Hiroshima, Japan

[73] Assignee: Mazda Motor Corporation, Hiroshima, Japan

[21] Appl. No.: 26,469

[22] Filed: Mar. 16, 1987

[30] Foreign Application Priority Data

Mar. 18, 1986 [JP] Japan .................................. 61-61717

[51] Int. Cl.$^4$ ............................................. F01C 21/00
[52] U.S. Cl. .................................... 418/178; 418/179; 29/156.4 WL
[58] Field of Search .................... 418/61 A, 178, 179, 418/113; 29/156.4 WL; 123/210, 211

[56] References Cited

U.S. PATENT DOCUMENTS

| | | | |
|---|---|---|---|
| 3,512,907 | 5/1970 | Belzner | 418/179 |
| 3,722,480 | 3/1973 | Berkowitz | 123/210 |
| 3,851,627 | 12/1974 | Terazawa | 418/178 |
| 3,892,028 | 7/1975 | Dobler | 123/210 |
| 4,056,339 | 11/1977 | Doi et al. | 418/178 |

FOREIGN PATENT DOCUMENTS 59-25841 6/1984 Japan .

Primary Examiner—John J. Vrablik
Assistant Examiner—Leonard P. Walnoha
Attorney, Agent, or Firm—Fleit, Jacobson, Cohn & Price

[57] ABSTRACT

A rotor housing for a rotary piston engine having improved gas sealing property between the inner surface and apex seals mounted on a rotor. The rotor housing has an inner surface applied with a hard layer such as chrome plating. The portions of the hard layer surrounding openings of plug holes at the inner surface side are formed with softened areas having lower hardness than the apex seals. The softened areas can be made by a high-energy beam such as a laser beam. Should portions surrounding the openings of the plug holes be thermally deformed to project inward and scratch the apex seals, the projected portions formed of the softened areas will be worn before the apex seals. Hence, uneven wearing of the apex seals can be avoided, which prevents degradation of the gas sealing property and consequently prevents drop in the compression pressure in the working chambers.

6 Claims, 4 Drawing Sheets

ROTOR HOUSING FOR A ROTARY PISTON ENGINE HAVING SOFTENED AREAS SURROUNDING THE PLUG HOLES

BACKGROUND OF THE INVENTION

1. Field of the Invention

The present invention relates to a rotor housing for a rotary piston engine and, more specifically to a rotor housing for a rotary piston engine with an improved gas-sealing property. The present invention also relates to a method of manufacturing such rotor housing for a rotary piston engine.

2. Description of the Prior Art

A rotary piston engine typically has a triangular rotor with convex sides which rotates in a rotor housing whose internal cross-section presents an oval shape slightly constricted in the middle (epitrochoid). The rotor has apex seals mounted on the three corners. When the rotor rotates the apex seals continuously sweep along the wall of the housing so as to maintain each chamber defined between the rotor and the inner wall surface of the housing in an airtight condition. In operation, if the apex seals or the inner surface of the housing are deformed due to the frictional heat therebetween the apex seals can wear out partially, which in turn causes a decrease in the gas-sealing property between the apex seals and the inner surface of the housing and thus a drop in the pressure of the compressed fuel may occur in the chambers.

It has been known in the field of rotary piston engines to apply to the inner surface of the housing a hard plating such as a chrome plating in order to improve the wear-resistant property thereof, as for example is disclosed in Japanese Patent Publication No. 25841/1984. Further, a film containing non-adhesive flouroplastic with a low coefficient of friction may be applied on the surface of the hard plating so as to improve the sliding property between apex seals and the inner surface of the housing. U.S. patent application Ser. No. 886,380, which was filed with convention priority based on Japanese Patent Application No. 166,391/1985, teaches that the rotor housing is formed at the inner wall surface with a Cr-Mo plating. The inner wall of such a rotor housing possesses excellent heat and wear resistant properties.

The above constructional of the inner surface show a good initial fit and prevent pressure drop in chambers between the rotors and the inner surface of the housing effectively. More specifically, the gas sealing property deteriorates when the apex seals wear partially due to thermal load such as heat from the friction between the apex seals and the inner wall surface. One cause of such loss of the gas sealing is thermal deformation of the apex seals themselves during the initial running period of the engine can be avoided to a certain extent by forming a hard plating or a fluroplastic film on the inner surface of the housing to improve the initial fit between the inner surface and the apex seals, as described above.

It is, however, impossible for the rotary housing with the inner surface wall formed of a hard plating such as a chrome plating to avoid sufficiently the drop in compression pressure in the chambers which is caused both during normal driving condition and in a high-power engine which gives off large amounts of heat.

The mechanism of such pressure drop is as follows. The rotary housing is formed with through-holes for ignition plugs at a predetermined position. The areas of the inner surface of the housing, which surround the ends of the holes, are exposed to the hot combustion gasses as well as the heat of the friction with the apex seals, and the temperature of these areas increases to a higher level than any other portion of the inner surface. Hence, the areas surrounding the hole ends are thermally deformed to project slightly toward the inner side of the housing due to the thermal load produced during the engine operation, especialy the high-load operation. The apex seals sliding on the inner surface are scratched by the projections of the inner surface and become unevenly worn, since the projections are formed of a harder layer, such as chrome plating, than the apex seals are. Thus, the gas sealing property between the apex seals and the inner surface gradually deteriorates, thereby causing a drop of the compression pressure in the chambers.

SUMMARY OF THE INVENTION

It is therefore an object of the present invention to provide a rotor housing having an inner wall surface which can maintain good gas sealing property between the inner surface and apex seals on a rotor disposed in the rotor housing.

Another object of the present invention is to provide a rotor housing having an inner wall surface which will not cause wear to the apex seals even at high temperatures.

A further object of the present invention is to provide a rotor housing which prevents apex seals from wearing unevenly because of thermal deformation of the portions of the inner wall surface surrounding the ends of the through-holes for ignition plugs and thereby improve the gas sealing property between the inner surface and apex seals and avoid a drop in the compression pressure in the chambers under any engine operating condition.

Another object of the present invention is to provide a process of manufacturing a rotor housing for a rotary piston engine which possesses an excellent gas sealing property between the inner surface thereof and apex seals on a rotor provided therein.

Still another object of the present invention is to provide a process of forming an inner wall surface of a rotor housing having an improved gas seal property without adversely affecting the heat and wear resistant properties thereof.

According to the present invention, the above and other objects can be accomplished by a rotor housing for a rotary piston engine having an inner wall surface formed of a hard layer on which apex seals of a rotor slide, characterized in that said inner wall surface is formed with softened areas surrounding the openings of through-holes for ignition plugs, said softened areas having a hardness lower than that of the apex seals. In a preferred embodiment, the inner surface of the rotor housing is provided with a chrome plating. The hardness of the chrome plating is preferably adjusted in the range of Hv 1030 to Hv 1100. In this case, the surface hardness of the apex seals is adjusted in the range of Hv 700 to Hv 900. The softened areas are formed by softening the chrome plating, the hardness of which is preferably between Hv 600 and Hv 700. Preferably, the size of the softened portion is such that the depth is 10 to 30 microns from the inner surface of the rotor housing and the width is 1 to 2 mm from the edge of the opening of the through-hole for the ignition plug.

In the rotor housing according to the present invention, the softened areas surrounding the openings of the through-holes for the ignition plugs are thermally deformed to project slightly toward the inside by heat such as the frictional heat from the sliding motion of the rotor along the inner surface of the rotor housing. The projected portions will scratch the apex seals mounted on the corners of the rotor as the rotor rotates. Since the projected portions are softened areas with a hardness lower than that of the apex seals, the projected portions will wear before the apex seals do, and hence, the apex seals will not become unevenly worn. In a preferred embodiment, the softened areas are formed within restricted areas just around the openings of the through-holes for the ignition plugs, while the other portion of the inner wall surface of the housing is provided with a hard layer such as chrome plating. Therefore, the overall inner surface of the housing still possesses excellent wear-resistance, which means deterioration of the gas sealing property caused by partial wear of the apex seals can be prevented without adversely affecting the wear-resistant property of the inner surface of the rotor housing.

According to the present invention, the above-mentioned rotor housing can be manufactured by heat-treating the portions of the hard layer provided on the inner surface of the housing around the openings of the through-holes for the ignition plugs by irradiation with a high-energy beam having good convergence. Preferably, a laser beam or an electron beam is used to form the softened areas. According to the present method, a beam with good convergence is used to form the softened areas so that only the desired areas of the inner surface of the housing are exposed to the beam. Hence, only the peripheral portions of the openings of the through-holes for the ignition plugs are softened, which is not easily attainable by another method.

Other objects and the advantages of the invention will become apparent from the following detailed description.

DESCRIPTION OF THE PREFERRED EMBODIMENT

While the invention will be described in connection with a preferred embodiment, it is to be understood that the invention is not limited to this embodiment. Instead, all alternatives, modifications, and equivalents are included as may come within the spirit and scope of the invention as defined by the attached claims.

Figure 1:
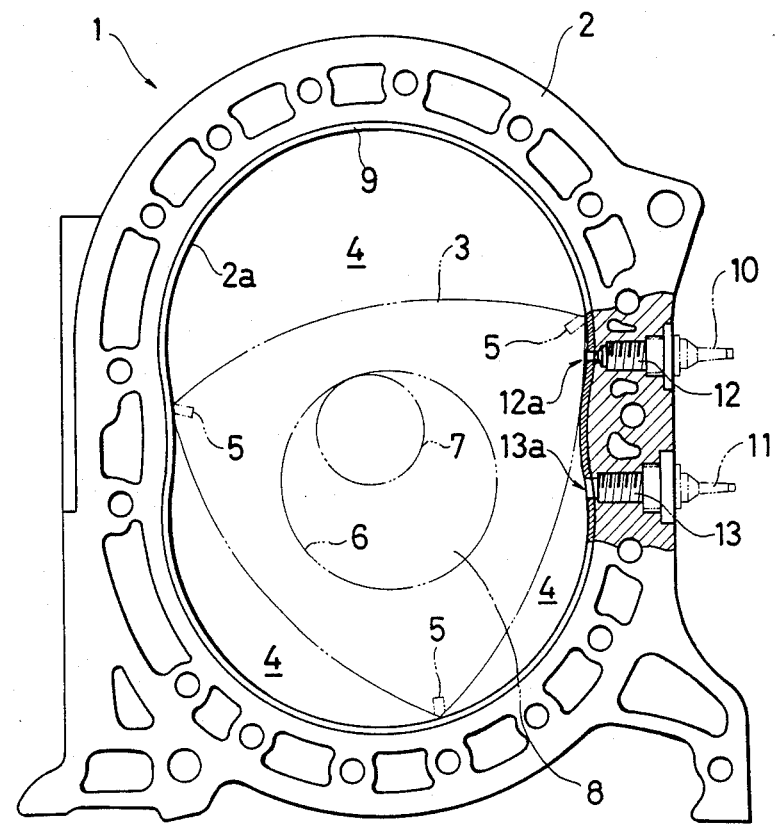
FIG. 1 is a front perspective side view of a rotor housing in a preferred embodiment according to the present invention.

Now referring to the drawings, FIG. 1 shows a rotary piston engine provided with a rotor housing in accordance with the present invention. The general construction of the engine will now be described briefly. As shown in FIG. 1, an engine housing 1 comprises a rotor housing 2 whose internal cross-section presents an oval shape slightly constricted in the middle and side housings (not shown) disposed on both sides of the rotor housing. The inner space defined by the rotor and side housings is provided with a triangular rotor 3.

The rotor 3 defines three working chambers 4 between the convex sides thereof and the inner wall surface 2a of the rotor housing 2 and has apex seals 5 mounted on the corners thereof. The apex seals 5 function to maintain the working chambers in gas sealed condition. A rotor gear (inner gear) 6 is formed in the rotor coaxially therewith, which rotor gear engages with a gear (outer gear) 7 fixed to the side housings. The rotor 3 rotates with the gears 6 and 7 being engaged with each other so that an eccentric shaft 8 carrying the rotor 3 is rotated about its axis. When the rotor 3 rotates the apex seals 5 continuously sweep along the inner wall surface 2a while maintaining each working chamber 4 in airtight condition.

In the illustrated embodiment, the rotor housing 2 is made from aluminum alloy and is casted with an insert metal 9 at its inner surface, the insert metal 9 being preformed to a trochoid configuration. The rotor housing 2 is also formed with two through holes 12 and 13, through which ignition plugs 10 and 11 are inserted. The holes 12 and 13 communicate with the inner space of the housing 2 through the ends 12a and 13a thereof, respectively. The inner surface 2a of the housing 2 is defined by the insert metal 9 on which, for improving the wear-resistant property thereof, a hard chrome plating is provided to form a hard chrome plating layer of desired thickness. In this embodiment, the thickness is about 100 microns. As well shown in FIG. 2, the metal 9 is formed with serrations 9a on its outer surface in order to obtain strong connection between the metal 9 and the body material of the housing 2.

Figure 2A:
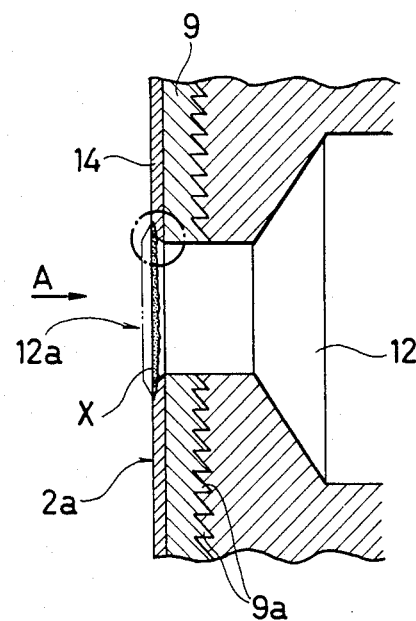
FIG. 2A shows an enlarged section of a through-hole for an ignition plug in the rotor housing of FIG. 1.
Figure 2B:
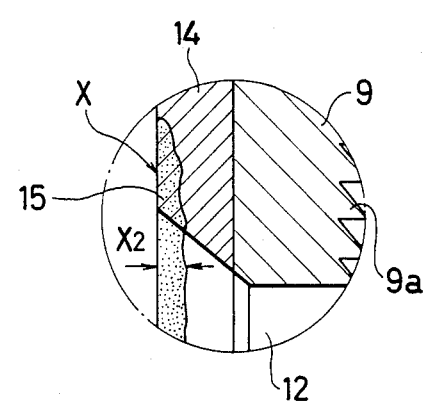
FIG. 2B shows an enlarged view of the encircled area shown in FIG. 2A.
Figure 3:
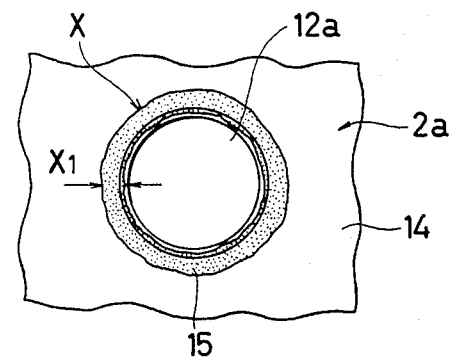
FIG. 3 is a front view of the area of the inner surface of the housing provided with the through-hole viewed from the direction of the arrow A of FIG. 2A.

The housing 2 according to the present invention has an inner surface 2a formed of a hard plating layer 14, the hardness of which is in the range of Hv 1030 to Hv 1100. The portions surrounding the ends 12a and 13a of the holes 12 and 13 are formed with softened areas X. Softened layers 15 forming the softened areas X have a hardness lower than that of the apex seals 5. Considering that the hardness of the apex seals 5 is typically in the range of Hv 700 to 900, the hardness of the softened layers 15 is preferably selected within the range of Hv 600 to 700. The size and shape of each softened area X can be determined with consideration to the thermal deformation occuring in the peripheral portions of the opening ends 12a and 13a during the respective driving conditions. In the present embodiment, the softened areas 15 are formed annularly along the peripheries of the opening ends 12a and 13a and are 1 to 2 mm in width X1 and 10 to 30 microns in depth X2. The width X1 is defined as the distance between the inner and outer sides of the softened area 15 as shown in FIG. 3 and the depth X2 is defined as the distance from the inner surface to the outer surface of area 15 as shown in FIG. 2A.

Figure 4A:
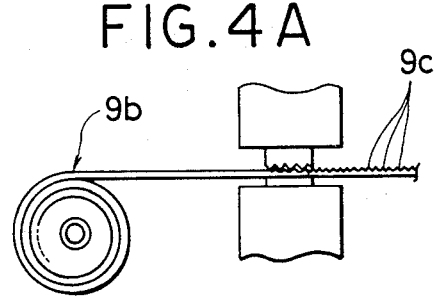
FIGS. 4A, 4B, 4C and 4D show the steps of SIP in the order which is adapted to manufacture the rotor housing shown in FIG. 1.
Figure 4B:
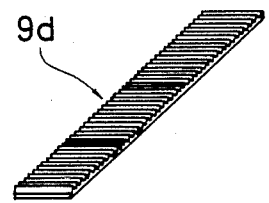
Figure 4C:
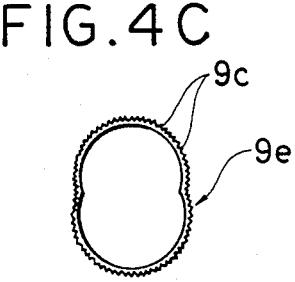
Figure 4D:
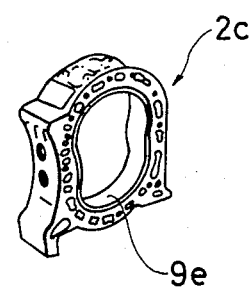

The process of fabricating the rotor housing 2 will now be described with respect to FIGS. 4A to 4D. In this embodiment, the blank material for the rotor housing is an aluminum alloy defined to AC4D alloy by Japanese Industrial Standards. The shaped blank is prepared by means of SIP (Sheet Metal Insert Process) in order to improve the fitting of a hard chrome plating to the inner surface of the housing in step to the explained later. This method (SIP) is as follows. As shown in FIG. 4A, an iron sheet 9b rolled in a coil shape is continuously pulled but its end in one direction continuously and at the same time is formed on one surface with fine serrations 9c. Then the iron sheet with the serrations is cut to a predetermined length and is blanked to prepare an iron sheet 9d having predetermined shape and size as shown in FIG. 4B. The iron sheet 9d is bent and its opposite ends are joined by welding, e.g. by flush butting welding, to form an annular ring. After that the annular ring is subject to a bending process to form a trochoidal shaped insert metal 9e with fine serrations on its outer surface as shown in FIG. 4C. The insert metal 9e is then cast inside the housing blank made of aluminum alloy by means of, for example, die casting to produce a rotor housing blank 2c as shown in FIG. 4D.

The insert metal 9e inserted in the housing blank 2c is machined to form holes which define opening ends of through holes for ignition plugs. The insert metal is further ground on its inner surface which form an inner surface 2a of a resulting housing 2 and then was applied with a hard chrome plating on the ground inner surface to thereby form a hard chrome plating layer of a desired thickness, for example, about 100 microns. Through grinding of the surface of the plating, a rotor housing as shown in FIG. 1 is obtained.

Figure 5:
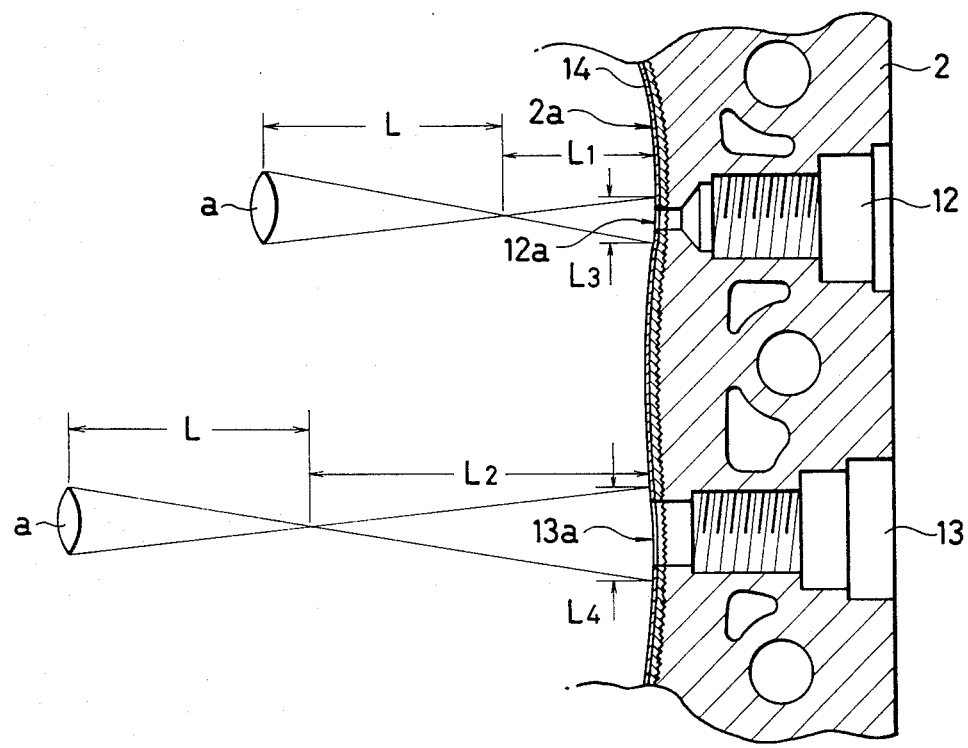
FIG. 5 shows the step of irradiation with a high-energy beam of the peripheral portions of the opening ends of the through holes for the ignition plugs.

In the present embodiment, the resulting rotor housing is further subjected to the following heat process. Referring to FIG. 5, laser beams are directed onto the peripheral portions of the opening ends 12a and 13a of the plug holes at the inner surface 2a of the housing 2, whereby the portions of the hard chrome plating 14 surrounding the opening ends 12a and 13a are softened and become softened areas X having a hardness lower than that of the apex seals 5 (refer to FIGS. 2A, 2B and 3). During the irradiation by the laser beam, lenses in the beams paths are moved relative to the peripheral portions of the opening ends 12a and 13a to adjust the distances L1 and L2 from the forcal points of the beams to the peripheral portions in order to adjust the diameters L3 and L4 of the beams at the peripheral portions to desired sizes, which in this embodiment are L3=9 mm and L4=15 to 16 mm, whereby the softened areas X are formed 1 to 2 mm in width X1 and 10 to 30 microns in depth. The conditions of the laser beam irradiation are set as follows:

Output Power: 1.5 KW
Focal Length of Lens: L=10 inches
Diameters of Beams: L3=9 mm, L4=15 to 16 mm
Gas: Ar 2.0 kg/cm$^2$, 50 l/min.
Irradiation Period: 1.5 sec.

As described above, the laser beams are directed such that the area irradiated thereby on the inner surface will contain the portions surrounding the openings 12a and 13a of the plug holes. Alternatively, a laser beam which irradiates an area of very small diameter on the inner surface of the housing may be used, by which the peripheral portions of the openings of the plug holes can be scanned to form softened areas X.

In the housing 2 constructed as described above, even when the peripheral portions of the openings 12a and 13a on the inner surface 2a are thermally deformed to project inward slightly due to the thermal effect caused by combustion gas and friction heat produced by the sliding motion of the apex seals on the inner surface 2a of the housing, the apex seals 5 will not be worn by these projected portions of the inner surface 2a. More specifically, the portions surrounding the opening ends 12a and 13a deformed to project inward of the housing due to the thermal load during operation, as shown by the phantom line in FIG. 2A. The apex seals 5 sweeping along the inner surface 2a are scratched at their top ends by these projected portions. According to the present embodiment, the projected portions are formed of the softened areas X whose hardness is lower than that of the apex seals 5, so that during the sliding motion of the apex seals 5 on the surface of the projected portions the apex seals will not wear before the projected portions. On the contrary, in the known rotor housing with a hard layer of chrome plating or the like, the projected portions are part of a hard layer having a hardness than the apex seals, which results in the local wear on the top ends of the apex seals. Hence, according to the present embodiment, degradation of gas sealing property due to uneven wear of the apex seals can be effectively avoided and, therefore, the compression pressure in the working chambers can be prevented from falling. Furthermore, the softened portions with which the housing of this embodiment is formed are very restricted areas limited to include only the portions which are expected to project, whereby the wear-resistant property of the inner surface of the housing can be maintained. Above all, the present method uses laser beams for forming the softened areas on the hard chrome plating layer 14. As the convergent property of a laser beam is excellent and considerably superior to other types of beam, the softened areas can easily be formed to a comparatively small size. On the contrary, where different heat applying process is used to form the softened area there is a danger of also softening portions outside the portions surrounding the opening ends 12a and 13a.

Test have been carried out with test pieces of rotor housings according to the invention in order to confirm the effects obtained by the present invention over the prior art rotor housings. Two test pieces S-1 and S-2 were prepared according to the present invention: S-1 was applied with a chrome plating, the portions of which surrounding the opening ends 12a, and 13a were formed with the softened areas X, while S-2 was applied with a chrome plating and a coating of a film containing a fluoroplastic on the plating. The coating was 5 to 10 microns thick and softened areas were formed the same as in S-1. The hardness of the chrome plating in both test pieces was in the range of Hv 1030 to 1100. The softened areas X in both pieces were formed such that the width X1 was about 2 mm and the depth X2 was about 30 microns. The average hardness of the softened areas were Hv 610 in S-1 and Hv 680 in S-2. Further two other pieces S-3 and S-4 were prepared, each having the same construction as one of the aforesaid two pieces except for not having the softened areas.

Each test piece was assembled in a two rotor type, 1300 cc, turbo-supercharged rotary piston engine with a maximum output power of 180 PS. The apex seals used had a hardness of Hv 700 to 900. The engine was then operated for 9000 cycles of operation, each cycle comprising operating the engine by fully opening the throttle valve from 3000 rpm to increase the engine speed to 7000 rpm under full load, maintaining it at the speed for 40 seconds and then releasing the throttle valve to lower the speed back to 3000 rpm. In the test run, the temperature of the engine cooling water was adjusted to those in each operating cycle. The compression pressure in the chambers of the engine was measured during the test run. After the test was finished, the apex seals were removed from the engine and amount of wear on the top thereof was measured. The results are shown in Table 1.

The apex seals were used in the above test which were made of a chilled alloy cast iron, whose composition was 3.5 C, 2.3 Si, 0.4 Mn, 0.2 P, 0.02 S, 0.5 Cr, 1.0 Cu, 1.5 Mo, 1.0 Ni, 0.01 Mn, 0.2 V, and the remainder of Fe.

TABLE 1

| Test Piece | Treatment | Compression Pressure $kg/cm^2$ | | | Wear of Apex Seals Maximum Wear occured at Central Portion ($\mu$m) |
|---|---|---|---|---|---|
| | | Start | 4000 cycle | 9000 cycle | |
| S-1 Treated with laser beam | Hardness of softened areas around plug holes Hv610 (average) | 10.0~11.5 | 10.0~11.0 | 10.0~11.5 | 50 (worn evenly) |
| S-2 Treated with laser beam | Hardness of softened areas around plug holes Hv680 (average) | 10.0~11.0 | 10.5~11.0 | 10.0~11.0 | 65 (worn evenly) |
| S-3 | Hardness of Cr plating on inner surface of rotor housing Hv1080 (average) | 10.5~11.0 | 6.5~7.0 | 5.0~5.5 | 250 (worn locally at central portion) |
| S-4 | Film coating containing fluoroplastic 5–10 $\mu$m | 10.0~11.0 | 7.0~8.0 | 6.5~7.5 | 185 (worn locally at central portion) |

It is obvious from Table 1 that in S-3 and S-4 the apex seals wore greatly at the central top portions and a drop in the compression pressure was observed due to the uneven wear. On the contrary, in S-1 and S-2 formed with softened areas surrounding the openings of the plug holes, the apex seals were evenly worn at their top portions and the amount of the wear was considerably less than at in S-3 and S-4. Namely, the wear was found to be reduced to one fourth of that in S-3 and S-4. It is also observed that no drop in the compression pressure occured in S-1 and S-2.

The present invention has been described with respect to a specific embodiment having a chrome plating as a hard layer on the inner surface of the housing. However, a chrome-molybdenum alloy can also be adapted as the hard layer. In this case, the same results as those obtained by the above-mentioned example can be realized.

We claim:

1. In a rotor housing for a rotary piston engine having an inner surface applied with a hard plating layer on which apex seals of a rotor slide, the improvement wherein the plating layer has a heat treated softened area which surrounds an opening of a plug hole at said inner surface the hardness of said softened area being lower than that of said apex seals so as to minimize wear of the seals.

2. The rotor housing in accordance with claim 1 in which said hard layer is of a chrome plating formed on said inner surface.

3. The rotor housing in accordance with claim 2 in which the hardness of said chrome plating is in the range of Hv 1030 to 1100, and the hardness of said softened area formed on said chrome plating is adjusted in the range of Hv 600 to 700, while the hardness of said apex seals is in the range of Hv 700 to 900.

4. The rotor housing in accordance with claim 2 in which the depth of said softened area is between 10 to 30 microns as measured from said inner surface of the housing.

5. The rotor housing in accordance with claim 2 in which the width of said softened area is between 1 to 2 mm as measured from the inner diameter to the outer diameter of the softened area.

6. The rotor housing in accordance with claim 3 in which said softened area is 10 to 30 microns in depth and 1 to 2 mm in width, said depth being measured from said inner surface of the housing and said width being the distance pg,22 between the inner and outer diameters thereof.

* * * * *